Patented Aug. 26, 1952

2,608,571

UNITED STATES PATENT OFFICE 2,608,571

PERESTERS OF OXO-SUBSTITUTED MONO-PEROXYCARBOXYLIC ACIDS

Frederick F. Rust, Oakland, and Alan R. Stiles and William E. Vaughan, Berkeley, Calif., assignors to Shell Development Company, San Francisco, Calif., a corporation of Delaware No Drawing. Application December 2, 1949,
Serial No. 130,851

13 Claims. (Cl. 260—453)

This invention relates to a novel class of organic compounds. More particularly, the invention relates to a new class of organic peresters, and to their utilization, particularly as polymerization catalysts.

Specifically, the invention provides new and valuable monoperesters of non-aromatic monoperoxycarboxylic acids containing an oxo group in the acid molecule in the beta position relative to the terminal peroxycarboxyl group. The invention also relates to the use of these novel monoperesters as polymerization catalysts, particularly for vinyl-type monomers.

Vinyl-type monomers, such as vinyl chloride, undergo polymerization in the presence of catalysts to produce valuable polymeric materials. Catalyst used for this purpose include the peroxides, such as benzoyl peroxide, the per-acids, such as persulfuric acid, the per-salts, such as potassium persulfate, and the aromatic peresters, such as tert-butyl perphthalate. These catalysts have been found to be satisfactory for polymerizing the monomers on a laboratory scale but their use in producing vinyl-type polymers for commercial applications leaves much to be desired. The known catalysts are, for example, quite ineffective at low temperatures and the reaction must be accomplished at a relatively high temperature to obtain a satisfactory rate of polymerization. The use of high temperatures in the polymerization of these monomers is undesirable as it produces polymers having low molecular weights, poor color and form-stability at room temperature, and inferior mechanical properties.

It is an object of the invention, therefore, to provide a new class of polymerization catalysts. It is a further object to provide polymerization catalysts which are effective at low reaction temperatures. It is a further object to provide polymerization catalysts which an initiate addition polymerization at a satisfactory rate at low temperatures. It is a further object to provide polymerization catalysts that can produce, at a relatively fast rate, polymers possessing superior mechanical properties. It is still a further object to provide a new class of organic peresters and a method for their preparation. It is still a further object to provide a new class of peresters having many unique properties which make them particularly useful and valuable in industry. Other objects and advantages of the invention will be apparent from the following detailed description thereof.

It has now been discovered that these and other objects of the invention may be accomplished by the monoperesters of non-aromatic monoperoxycarboxylic acids containing an oxo group in the acid molecule in the beta position relative to the terminal peroxycarboxyl group. It has been found that when these particular monoperesters are employed as catalysts, particularly in a slightly alkaline medium, the polymerization of the vinyl-type monomers may be accomplished at a surprisingly fast rate even at very low reaction temperatures. Thus, while the polymerization of vinyl chloride with the known catalysts requires from 24 to 72 hours to complete at temperatures from 80° C. to 100° C., the same polymerization may be accomplished with the above-described group of novel monoperesters in the surprisingly short period of 15 minutes at room temperature using only about one-tenth the usual amount of catalyst. In addition, it has been found that the polymers produced by the use of these particular catalysts possess superior properties even though they were formed at a very fast rate.

In accordance with the system of nomenclature suggested in 39 C. A. 5939 (1945), the simple ester group in the compounds described in the present specification and appended claims will be designated by the use of the prefix O- and the perester group will be designated by the use of the prefix O,O-. Thus O,O-tert-butyl O-ethyl monoperoxymalonate has the formula

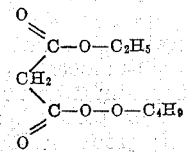

The novel compounds of the invention comprise the monoperesters theoretically obtained by esterifying non-aromatic monoperoxycarboxylic acids containing an oxo group, i. e., a

group, in their molecule, in the beta position relative to the terminal peroxycarboxyl group, with monohydric alcohols. The aforedescribed acids may be aliphatic, alicyclic or heterocyclic and may be saturated or unsaturated. The essential oxo group in the acid molecule may be present in groups such as a keto group, a carboxyl group, or an ester radical. If the acids contain simple ester radicals the said radicals may be obtained by the esterification of one or more carboxyl groups in the acid molecule with any type of alcohol, such as saturated and unsaturated, aliphatic and alicyclic alcohols, phenols, and the like, as methyl alcohol, ethyl alcohol, butyl alcohol, amyl alcohol, octyl alcohol, decanol, tetradecanol, allyl alcohol, methallyl alcohol, cyclohexenol, phenol, benzyl alcohol, chlorobutanol, cyanohexenol, and isopropanol. Examples of the oxo-substituted acids are beta-ketoperoxybutyric acid, beta-ketoperoxyhexanoic acid, beta-ketoperoxyheptanoic acid, beta,delta-diketoperoxyhexanoic acid, 2-ketoperoxycyclohexanoic acid, O-ethyl monoperoxymalonate, O-butyl monoperoxymalonate, O-cyclohexyl monoperoxymalonate, monoperoxymalonic acid, beta-ketomonoperoxyglutaric acid, O-butyl beta-ketomonoperoxyglutarate, hexyl,5 - percarboxy,4 - hexanoate, 2-ketoperoxyhepten - 5 - oic acid, beta - ketodeltachloroperoxyhexanoic acid, beta-keto-delta-cyanoperoxyheptanoic acid, and 2-keto-4-bromoperoxycyclohexanoic acid.

Preferred oxo-substituted non-aromatic monoperoxycarboxylic acids used in the theoretical production of the novel monoperesters are the members of the group consisting of (1) the beta keto-substituted non-aromatic peroxymonocarboxylic acids containing from 3 to 20 carbon atoms, (2) the keto-substituted non-aromatic monoperoxydicarboxylic acids having a keto group in the beta position relative to the peroxycarboxyl group, (3) the non-aromatic monoperoxydicarboxylic acids having the carboxyl group in the beta position relative to the peroxycarboxyl group and containing from 3 to 20 carbon atoms and (4) the O-monoesters of the keto-substituted non-aromatic monoperoxydicarboxylic acids described in the second group and (5) the O-monoesters of the non-aromatic monoperdicarboxylic acids described in the third group. Illustrative examples of these preferred acids are beta-ketoperoxybutyric acid, beta-ketoperoxyhexanoic acid, 2-ketoperoxycyclohexanoic acid, 2-ketoperoxycyclopentanoic acid, O-ethylmonoperoxymalonate, O-cyclohexyl monoperoxymalonate, O-phenyl monoperoxymalonate, beta-ketomonoperoxyglutaric acid, beta-keto-delta-chloroperoxyhexanoic acid, beta-keto-delta-cyanoperoxyheptanoic acid, 2-keto-4-bromoperoxycyclohexanoic acid, and hexyl 5-percarboxy-4-ketohexanoate.

Particularly preferred acids are (1) the beta-keto-substituted non-aromatic peroxymonocarboxylic acids containing from 3 to 12 carbon atoms, and (2) the O-monoesters of monohydric alcohols containing from 1 to 10 carbon atoms and non-aromatic monoperoxydicarboxylic acids having the carboxyl group in the beta position relative to the peroxycarboxyl group and containing from 3 to 12 carbon atoms. Illustrative examples of these preferred acids are beta-keto-peroxybutyric acid, beta-keto-peroxyheptanoic acid, beta-keto-peroxydodecanoic acid, O-butyl monoperoxymalonate, O-cyclohexyl monoperoxymalonate, O-chlorophenyl monoperoxymalonate, and O-decyl monoperoxymalonate. Especially preferred acids are the beta-keto-substituted peroxyalkanoic acid containing from 3 to 12 carbon atoms, and the O-monoesters of monohydric aliphatic alcohol containing from 1 to 10 carbon atoms and monoperoxyalkanedioic acids having the carboxyl group in the beta position relative to the peroxycarboxyl group and containing from 3 to 12 carbon atoms.

The alcohols theoretically employed in the esterification of the above-described oxo-substituted non-aromatic monoperoxycarboxylic acids are preferably the tertiary monohydric alcohols, i. e., those alcohols possessing a tertiary carbon atom, preferably attached directly to the hydroxyl group. Examples of such alcohols are tertiary butanol, tertiary hexanol, tertiary octanol, tertiary decanol, diphenylethylcarbinol, triphenylcarbinol, phenyldibutylcarbinol, chlorophenylethylbutylcarbinol, cyclohexyldiphenylcarbinol, and cyclopentyldimethylcarbinol. Particularly preferred alcohols are the tertiary monohydric alcohols containing from 4 to 18 carbon atoms. Especially preferred are the tertiary alkanols containing from 4 to 10 carbon atoms.

The novel monoperesters of the invention are theoretically obtained by esterifying any of the above-described acids with any of the above-described alcohols. Examples of the novel monoperesters are tert-butyl beta-ketoperoxybutyrate, tert-hexyl beta-ketoperoxyhexanoate, tert-octyl beta-ketoperoxyoctanoate, dimethylbenzyl beta,-delta-diketoperoxyhexanoate, triphenylcarbinyl 2-ketoperoxycyclohexanoate, O-O-tert-butyl O-ethyl monoperoxymalonate, O-O-tert-octyl O-cyclohexyl monoperoxymalonate, O,O-tert-amyl O-phenyl beta-ketomonoperoxydipate, O,O-tert-butyl monopermalonate, and tert-hexyl beta-keto-delta-cyanoperoxyheptanoate.

The preferred monoperesters of the invention, i. e. those theoretically obtained by esterifying the above-described preferred acids with the preferred tertiary monohydric alcohols containing from 4 to 18 carbon atoms, may be exemplified by tert-butyl beta-ketoperoxybutyrate, tert-octyl beta - ketoperoxyhexanoate, diphenylbenzyl 2-ketoperoxycyclopentanoate, O,O - tert - butyl O-ethyl monoperoxymalonate, O,O-tert-amyl O-cyclohexyl monoperoxymalonate, O,O-tert-amyl O - isohexyl beta-ketomonoperoxyadipate, O,O-tert - butyl monopermalonate, tert - hexyl beta-ketoperoxyoctanoate, and diphenylbenzyl 2-ketoperoxycyclohexanoate.

The particularly preferred monoperesters, i. e., those theoretically derived from the above-described particularly preferred acids and the tertiary alkanols containing from 4 to 10 carbon atoms, may be illustrated by tert-butyl beta-ketoperoxybutyrate, tert-octyl beta-ketoperoxyhexanoate, O,O-tert-amyl O-ethyl monoperoxymalonate, O,O-tert-decyl O-decyl monoperoxymalonate, O,O-tert-hexyl O-cyclohexyl monoperoxymalonate, and tert-decyl beta-ketoperoxyhexanoate.

The above-described monoperesters cannot be obtained by a direct esterification of a peracid with an alcohol as the hydroxy group of the water of esterification must come from the acid and not the alcohol. Special methods must, therefore, be employed for the preparation of these particular compounds. The more preferred method comprises reacting a hydroperoxide with the desired acyl halide in the presence of an alkali.

The preferred hydroperoxides to be used in this process are those derived from the above-described tertiary monohydric alcohols, such as tertiary-butyl hydroperoxide, tertiary-amyl hydroperoxide, diphenylmethylcarbinyl hydroperoxide, 5-butyl,5-hydroperoxy-decane, dimethylbenzyl hydroperoxide, cyclohexyldiphenylcarbinyl hydroperoxide, and cyclopentyldimethylcarbinyl hydroperoxide.

The acyl halides used in the process may be exemplified by beta-ketobutyryl chloride, beta-ketohexanoyl chloride, beta,delta-diketo-octanoyl chloride, beta-ketodecanoyl chloride, beta-keto-heptanoyl chloride, beta-keto-gamma-butylvaleryl chloride, 2-ketocyclohexanoyl chloride, 2-chloroformylacetic acid, 2-chloroformylhexanoic acid, 2-chloroformyladipic acid, butyl 2-chloroformylpropionate, cyclohexyl 2-chloroformylhexanoate, dihexyl 2-chloroformyladipate, dioctyl 2-chloroformylsuccinate, and the like.

The alkali employed in the process includes pyridine, sodium or potassium bicarbonate, or sodium hydroxide. A sufficient amount of the alkali should be used to insure that the reaction mixture will be alkaline throughout the reaction, i. e., an excess over that necessary to react with the acyl halide.

The reaction may be conducted in the presence or absence of solvents or diluents. In the case of the more viscous peroxides inert solvents, such as carbon tetrachloride, heptane, or octane, may advantageously be employed.

The proportions of hydroperoxide and acyl halide employed in the reaction may vary over a considerable range. It is generally desirable to react the acyl halide with at least a chemical equivalent amount of the hydroperoxide. The expression "chemical equivalent amount" as employed throughout the specification and claims refers to the amount of hydroperoxide required to furnish approximately one peroxide group for every acyl group to be reacted. Preferably the acyl halide and hydroperoxide are reacted in chemical equivalent ratios of 1:1 to 1:1.5, respectively.

The reaction is ordinarily conducted in the liquid phase in a vessel equipped with suitable heating or cooling means. Preferably, the reaction is conducted in a batch operation with the hydroperoxide, alkali and solvent, if any, being added first and the acyl halide being added in small quantities over a period of time. The reaction temperature will vary somewhat with the reactants. In some instances the reaction proceeds at a rapid rate at temperatures as low or lower than 0° C., while in other cases it may be necessary to raise the temperature to 30° C., or above to obtain a satisfactory reaction rate. Preferred temperatures range from 0° C. to 100° C. Atmospheric, superatmospheric, or subatmospheric pressures may be utilized as desired.

The monoperesters may be recovered from the reaction mixture by any suitable means, such as precipitation, extraction, filtration, fractional distillation, and the like.

The novel monoperesters of the invention possess many unusual properties which make them particularly useful and valuable in industry. They are valuable, for example as bleaching agents for flour, etc., as sterilizing agents or components for antiseptic compositions, as driers for oils as linseed and tung oil, and as catalysts for free radical chain reactions, such as the addition of polyhalogenated hydrocarbons to olefins, and various telomerization reactions as disclosed in U. S. Patents No. 2,348,021, No. 2,418,832, and No. 2,440,801.

The novel monoperesters are especially valuable as catalysts for the polymerization of vinyl-type monomers. The expression "vinyl-type monomers" includes all those organic compounds containing at least one $CH_2=C=$ group in their molecule. Examples of these monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adipate, methallyl propionate, allyl chloride, methallyl chloride, allyl acrylate, and methallyl methacrylate.

The peresters are also effective as catalysts for the copolymerization of the above-described compounds with other types of polymerizable organic compounds, particularly those containing at least one ethylenic linkage, such as ethylene, the saturated esters of the unsaturated acids, such as diethyl maleate, dibutyl crotonate, and the like.

Polymerization of the vinyl-type monomers in the presence of the novel monoperesters may be accomplished by a variety of methods. The polymerization may be accomplished in bulk, in a solvent solution or in an aqueous emulsion or suspension. The monoperesters usually display their maximum catalytic activity in a mildly alkaline medium so it is usually desirable to accomplish the polymerization in an aqueous emulsion where the desired pH may be easily maintained. In this preferred method the material to be polymerized is added to a mixture containing water, an emulsifying agent, a mildly alkaline pH adjuster, and the monoperester catalyst, and the resulting mixture maintained at the desired temperature and pressure.

Emulsifying agents that may be employed in the preferred process include the soaps, such as sodium and potassium myristate, laurate, palmitate, oleate, stearate, rosinate and hydroabietate; the alkali metal alkyl or alkylene sulfates, such as sodium lauryl sulfate, potassium stearyl sulfate; the alkali metal alkyl or alkylene sulfonates, such as sodium lauryl sulfonates, potassium stearyl sulfonate, and sodium cetyl sulfate; sulfonated mineral oil, as well as the ammonium salts thereof; and salts of high amines like lauryl amine hydrochloride, and stearyl amine hydrobromide. The amount of the emulsifying agent employed will generally vary between about 0.1% and 6% by weight of the monomer, preferably between 0.1% and 2% by weight of the monomer.

The desired alkalinity may be maintained by the addition of alkaline pH adjusters, such as trisodium phosphate, sodium carbonate, sodium bicarbonate, tetrasodium pyrophosphate, disodium hydrogen phosphate and calcium carbonate.

The temperature employed in the polymerization may vary over a considerable range. The advantages of using the novel monoperesters as catalysts are more prominent, however, when the relatively low temperatures are employed. The use of temperatures as low or lower than —10° C. gives very satisfactory polymerization rates and produces polymers having the desired superior properties. Preferred temperatures range from 0° to 50° C. Atmospheric, superatmospheric or subatmospheric pressures may be employed as desired.

The polymers formed during the above-described process will in most cases appear in the form of a latex which may readily be recovered by conventional means, such as addition of electrolytes, solvents, freezing, dehydration, and the like.

The resulting polymers are substantially colorless products possessing exceptionally high molecular weights. Plasticized specimens of the polymers possess excellent color and increased tensile strength and flexibility over a wide range of temperatures and may be utilized with great success for a variety of commercial applications, such as the formation of rigid plastic articles of various shapes and sizes, surface coating compositions, impregnating agents, and the like.

To illustrate the manner in which the invention may be carried out the following examples are given. It is to be understood, that the examples are for the purpose of illustration and the invention is not to be regarded as limited to any of the specific conditions cited therein. Unless otherwise specified, parts described in the examples are parts by weight.

*Example I.—O,O-tert-butyl O-ethyl monoperoxymalonate*

About 22 parts (.146 mole) of malonic acid ethyl ester chloride was added dropwise simultaneously with 11.5 parts (.146 mole) of pyridine to 83 parts of 0.178 molar t-butyl hydroperoxide in petroleum ether. The solution was stirred and cooled in Dry Ice. The product precipitated out of petroleum ether at Dry Ice temperature as a very viscous oil containing a few suspended crystals. The ether was decanted and the residue evacuated thoroughly. The resulting product, O,O-tert-butyl O-ethyl monoperoxymalonate, had a refractive index of $n_D^{20}$ 1.4261.

*Example II.—Tert-butyl beta-ketoperoxybutyrate*

Acetoacetyl chloride was prepared by adding dry hydrogen chloride to 16.8 parts of diketone at 7° C. to 60° C. The resulting product was dissolved in petroleum ether-diethyl ether and treated dropwise with 0.2 mole of tert-butyl hydroperoxide in petroleum ether and 0.2 mole (15.8) parts of pyridine. The temperature of reaction was maintained at −50° C. by a Dry Ice-acetone bath. When the addition was complete the reaction mixture was allowed to warm to 0° C. and was then stirred for two hours at that temperature. The solution was washed with water and with two successive portions of aqueous sodium bicarbonate and then dried over calcium sulfate. The product crystallized out of solution at low temperatures. The ether was decanted and residue evacuated at 1 mm. for 3 to 4 hours. The final product, tert-butyl beta-ketoperoxybutyrate, had a refractive index of $n_D^{20}$ 1.4303, carbon %w found 55.5%, calculated 55.2%, hydrogen %w found 8.7, calculated 8.0.

*Example III.—Tert-amyl beta-ketoperoxyhexanoate*

About 14.8 parts of beta-ketohexanoyl chloride is added dropwise over a period of about 40 minutes to a stirred solution composed initially of 10.2 parts of anhydrous tert-amyl hydroperoxide and 7.9 parts of pyridine in about 150 parts of petroleum ether. The temperature of the solution during the addition is maintained between 5° C. and 10° C. by immersing the flask in an ice bath. After all the acid chloride is added, the bath is removed and the stirring continued for about one hour. The water soluble components are removed by extracting with ten 50 cc. portions of water. The product, tert-amyl beta-ketoperoxyhexanoate, is isolated by cooling the petroleum ether solution to the temperature of Dry Ice and then decanting the ether.

*Example IV.—O,O-alpha,alpha-dimethylbenzyl O-amyl monoperoxymalonate*

To a suspension containing 6.6 parts (0.02 mole) of 53% sodium alpha,alpha-dimethylbenzyl hydroperoxide in 50 parts of petroleum ether is added 4.6 parts of malonic acid amyl ester chloride. The mixture is allowed to stand at room temperature for one hour with occasional stirring. At the end of this time the solution is washed with 50 parts of water and with two successive 25 parts of 5% aqueous sodium bicarbonate. The solution is dried over anhydrous sodium sulfate and the solvent removed by evaporation at reduced pressure to yield O,O-alpha,alpha,dimethylbenzyl O-amyl monoperoxymalonate.

*Example V.—O,O-tert-butyl O-ethyl beta-ketomonoperoxyglutarate*

About 19.2 parts of ethyl 3-keto-4-choloroformylbutyrate is added dropwise to a stirred solution composed initially of 9.9 parts of anhydrous tert-butyl hydroperoxide and 7.9 parts of pyridine in about 150 parts of petroleum ether. The temperature of the solution during the addition is maintained between 5° C. and 100° C. by immersing the reaction vessel in an ice bath. After all the acid chloride is added, the ice bath is removed and the stirring continued for about 30 minutes. The water-soluble constituents are removed from the petroleum ether solution by extracting with eight 100 cc. portions of water. The product O,O-tert-butyl O-ethyl beta-ketomonoperoxyglutarate, is isolated by cooling the petroleum ether solution to the temperature of Dry Ice for one hour and then decanting the ether.

*Example VI.—Polymerization with O,O-tert-butyl O-ethyl monoperoxymalonate*

The superiority of the novel monoperesters as polymerization catalysts for vinyl-type monomers, particularly in regards to the speed of reaction and quality of polymer produced, is shown in the following sections:

(a) About 100 parts of vinyl chloride was added to a mixture containing about 400 parts of water, 0.5 part of sodium lauryl sulfate, 0.5 part of trisodium phosphate, and 0.5 part of O,O-tert-butyl O-ethyl monoperoxymalonate. The resulting mixture was maintained at 40° C. In 15 minutes a 97.5% conversion to polymer had been obtained.

100 parts of the polymer produced above was mixed with 50 parts of dioctyl phthalate, 2 parts of glycerol monooleate and the resulting mixture milled 5 minutes at 140° C. and pressed two minutes at 160° C. The resulting flexible specimen possessed clear color and excellent tensile strength and flexibility over a wide range of temperatures.

(b) About 100 parts of monomeric vinyl chloride was added to a mixture containing 400 parts of water, 5 parts of sodium lauryl sulfate and 1 part of hydrogen peroxide and the mixture heated to 50° C. Over 24 hours of heating at this temperature was required to obtain a 35% yield of polymer. Flexible specimens prepared by the method used in (a) above had poor color, low tensile strength and poor flexibility.

(c) About 100 parts of monomeric vinyl chloride was added to a mixture containing about 300 parts of water, 2 parts of sodium lauryl sulfate and 2 parts of diacetyl peroxide and the mixture heated to 50° C. Over 56 hours of heating at this temperature was required to obtain a 78% yield of polymer.

(d) About 100 parts of vinyl chloride was added to a mixture containing about 300 parts of water, 2 parts of sodium lauryl sulfate and 2 parts of tert-butyl perbenzoate and the mixture heated at 50° C. Over 46 hours of heating at this temperature was required to obtain a 27% yield of polymer.

*Example VII.—Polymerization with tert-butyl beta-ketoperoxybutyrate*

About 100 parts of vinyl chloride was added to a mixture containing about 400 parts of water, 0.5 part of sodium lauryl sulfate, 0.5 part of sodium bicarbonate, and 0.25 part of tert-butyl beta-ketoperoxybutyrate. The mixture was maintained at a temperature of 40° C. Polymer was formed in the emulsion within five minutes. A plasticized specimen prepared as shown in Example VI possessed the following physical properties: Tensile strength, 2470 p. s. i.; ultimate elongation, 310%; and a clear color.

We claim as our invention:

1. Tert-butyl beta-ketoperoxybutyrate.
2. O,O-tert-butyl O - ethyl - monoperoxymalonate.
3. Tert-amyl beta-ketoperoxyhexanoate.
4. O,O-tert-butyl O-ethyl beta-ketomonoperoxyglutarate having the structural formula

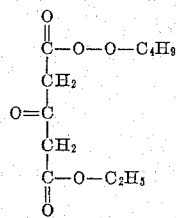

5. A tert-alkyl monoperester of a beta ketosubstituted peroxyalkanoic acid containing from 3 to 12 carbon atoms.
6. A O,O-tert-alkyl O-alkyl ester of a monoperoxyalkanediotic acid having the carboxyl group in the beta position relative to the peroxycarboxyl group and containing from 3 to 12 carbon atoms.
7. A monoperester theoretically derived by esterifying a beta keto-substituted non-aromatic peroxymonocarboxylic acid containing from 3 to 20 carbon atoms with a tertiary monohydric alcohol.
8. A monoperester theoretically derived by esterifying (1) an O-ester of a monohydric alcohol and a non-aromatic monoperoxydicarboxylic acid having the carboxyl group in the beta position relative to the peroxycarboxyl group and containing from 3 to 20 carbon atoms with (2) a tertiary monohydric alcohol.
9. A monoperester theoretically derived by esterifying (1) an O-ester of a monohydric alcohol and a keto-substituted non-aromatic monoperoxydicarboxylic acid having the keto group in the beta position relative to the peroxycarboxyl group and containing from 3 to 20 carbon atoms with (2) a tertiary monohydric alcohol.
10. A monoperester theoretically derived by esterifying a member of the group consisting of (1) the beta keto-substituted non-aromatic peroxymonocarboxylic acids containing from 3 to 20 carbon atoms, (2) the keto-substituted non-aromatic monoperoxydicarboxylic acids having a keto group in the beta position relative to the peroxycarboxyl group and containing from 3 to 20 carbon atoms, (3) the non-aromatic monoperoxydicarboxylic acids having the carboxyl group in the beta position relative to the peroxycarboxyl group and containing from 3 to 20 carbon atoms, (4) the O-monoesters of the keto-substituted non-aromatic monoperoxydicarboxylic acids described in the above-described second group, and (5) the O-monoesters of the non-aromatic monoperoxydicarboxylic acids described in the above-described third group, with a tertiary monohydric alcohol.
11. A monoperester of a non-aromatic oxosubstituted monoperoxycarboxylic acid wherein the oxo group is contained in the acid molecule in a beta position relative to the peroxycarboxyl group.
12. O,O-alpha,alpha-dimethylbenzyl O - amyl monoperoxymalonate.
13. An O,O-alpha,alpha - dimethylbenzyl O-Alkyl ester of a monoperoxyalkanedioic acid having the carboxyl group in the beta position relative to the peroxycarboxyl group and containing from 3 to 12 carbon atoms.

FREDERICK F. RUST.
ALAN R. STILES.
WILLIAM E. VAUGHAN.

REFERENCES CITED

The following references are of record in the file of this patent:

Rybolt et al., Modern Plastics (April 1949), pages 101–103.